Patented May 23, 1950

2,508,433

UNITED STATES PATENT OFFICE 2,508,433

ALGINIC ACID SULFATE ANTICOAGULANT

Eric G. Snyder, Philadelphia, Pa., assignor to Wyeth Incorporated, Philadelphia, Pa., a corporation of Delaware No Drawing. Application October 16, 1946, Serial No. 703,463

9 Claims. (Cl. 167—65)

This invention relates to alginic acid sulfate compositions, i. e. to alginic acid esters of sulfuric acid and to their water-soluble salts; it also relates to the use of these compounds in preventing the clotting of blood.

Heparin has long been used clinically to prevent the clotting of blood, for example, to prevent post-operative thrombosis. It is injected intravenously in the form of its sodium salt dissolved in normal saline solution. Heparin is well suited for such use since it is a potent anti-coagulant and has low toxicity. It has, however, the great disadvantage of being available only in relatively small quantities at a high price. Consequently, efforts have been made to find a satisfactory substitute for heparin which would be cheaper and readily available.

The constitution of heparin is not known with exactness, but it appears to be a complex polysaccharide containing glucuronic acid and glucosamine units the free hydroxy groups of which are esterified with sulfuric acid. Efforts to find a substitute have been largely directed to investigating such compounds as the sulfates of cellulose, pectin, chitin, and chondroitin and the sulfates of derivatives of such polysaccharides. While these investigations have met with some success, all the materials investigated which proved to have useful anticoagulant activity have, as far as I know, been sufficiently less potent and more toxic than heparin to make their use impractical, the more potent of these substitutes being in general also the more toxic. For example, according to Karrer, Koenig and Usteri—Helvetica Chimica Acta, 26 (1943), 1299–1300—a chondroitinsulfuric acid sulfate ester was 4 times as toxic as heparin but only ⅙ as potent, while a pectin sulfate ester which was ⅓ as potent as heparin was 10 times as toxic—all on a weight basis and presumably in the form of their sodium salts.

The absolute toxicity is not controlling in clinical use and in animal experimentation; it is essential, however, that the amount of material administered to produce a required anticoagulant effect should be well below—say a small fraction of—a minimum toxic quantity. Another desirable feature in an anticoagulant, both for clinical and non-clinical use, is duration of effect; prolonged effect reduces the frequency of administration. A still further desirable feature is availability of a steady commercial supply of raw material for the anticoagulant at a reasonable price.

I have discovered that highly effective anticoagulants may be obtained by esterifying alginic acid with sulfuric acid. These anticoagulants are preferably used in the form of their non-toxic water-soluble salts, e. g. sodium salts. Their effective dosage concentrations and amounts are so far below toxic quantities that they have proved useful, safe and satisfactory in in vivo animal experimentation, and have also been found exceptionally useful in in vitro physiological chemical applications, for example in maintaining the fluidity of blood in connections to continuous-reading sphygmomanometers.

Alginic acid or algin, which is mainly derived from seaweeds, is a complex built up of mannuronic acid units; its probable formula is:

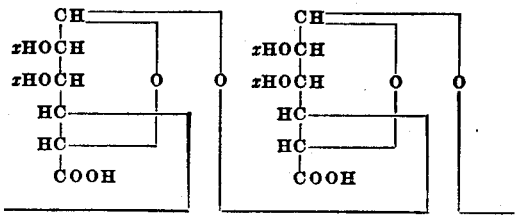

Accordingly, it is polyanhydromannuronic acid. The product obtained commercially, which I use as a raw material, is a colloidal substance. Like most high-molecular-weight natural materials of this kind, it is not a chemical individual, but a mixture of polymers of various molecular weights, all, however, apparently constituted of anhydromannuronic acid units.

As will be seen from the above formula, each unit has two free hydroxyl groups marked $x$ which may be esterified. By treating alginic acid, which has been prepared from the commercial sodium salt, at a moderate temperature with a halo-sulfonic acid such as chlorosulfonic acid in the presence of an anhydrous acid-acceptor such as pyridine, I esterify a large fraction of the free hydroxyl groups to form sulfates, without substantial depolymerization of the alginic acid.

The product is a mixture of polyesters containing varying percentages of the —O—SO₃H group. The approximate theoretical sulfur content of the disulfate is 19% S, and of the monosulfate 12.5% S. The corresponding percentages of sulfur in the sodium salts of the di- and monosulfates are 16.9% and 11.6% S, assuming Na in the NaOSO₃-groups only. I have been able to fractionate the sulfation mixture into low-, intermediate- and high-sulfur fractions on the basis of water solubility. The fractions I obtained contained respectively, about 11–17%, 9.5–12.5% and 5% sulfur by weight. The amounts of sulfur in these fractions indicate that only partial sulfation is accomplished, but I have so far been unable to determine the distribution of the sulfate groups in the polymeric alginic acid molecules.

The anti-coagulant effects and toxicity of my products have been evaluated in laboratory animals (mice, rabbits, dogs) and the results compared with those produced by natural heparin. The duration of their effect in rabbits has also been determined. In general, the results have been more favorable in vivo than in vitro as compared with heparin. While my products are less potent than heparin, the effective dosage is so far below the toxic dosage that their use has proved safe. The duration of the anticoagulant effect of my products after withdrawal of blood is longer than that of heparin. For example, where 110 Toronto units of heparin per kg. of rabbit prolonged the clotting time of blood withdrawn 20 minutes after injection to 5 hours and 20 minutes, 110 units (based on in vitro assay) of a high-sulfur fraction of my product prolonged the clotting time of a 20-minute sample to more than 7 hours. The comparative duration of the effect in the rabbit system is shown by a series of experiments with heparin and with my compound. Varying dosages of standard heparin (110 Toronto units per mg.) were intravenously injected into rabbits and the time determined which was required for the blood of the rabbits to return to normal as respects clotting time. The results were:

| Heparin Dosage—Toronto units per kg. of body weight | Time required for blood to return to normal |
|---|---|
| Units | Minutes |
| 27.5 | 17 |
| 55 | 55 |
| 110 | 60 |
| 220 | 72 |
| 330 | 95 |
| 440 | 135 |
| 550 | 135 |
| 660 | 153 |
| 770 | 125 |
| 880 | 140 |
| 990 | 145 |
| 1,100 | 125 |
| 1,500 | 135 |

It will be seen from these results that a maximum duration of effect (approximately 2½ hours) was produced by dosages in the range of 440–660 u./kg. and that further increase of dosage up to 1500 u./kg. did not extend the duration of reduced clotting activity of the blood beyond about 2½ hours.

With my products, on the other hand, no such approach to a maximum duration was found, as is shown by the following data.

| Sodium Alginic Acid Sulfate Dosage—mg. per kg. of body weight | Time required for blood to return to normal |
|---|---|
| 10 | ineffective. |
| 20 | 120 minutes. |
| 40 | 180 minutes. |
| 125 | more than 8 and less than 24 hours. |

The maximum duration attained was more than 3 times that of heparin with a dosage approximately ⅕ of LD 50. No dangerous toxic effects on the animals were observed.

In using a continuous-reading sphygmomanometer in physiological and pharmacological investigations, blood in the canula was successfully kept from clotting for 6 hours by substituting a saline solution containing 0.1% of one of my preparations for the usual citrated saline solution in the tube connecting canula and manometer. In this case, none of my product was introduced into the system of the experimental animal.

Specific examples of the preparation and properties of my products follow, but these are to be taken as illustrative only and not as limiting the scope of my invention which is defined in the appended claims.

Examples

1. *Purification of alginic acid.*—One hundred grams of a commercial sodium salt of alginic acid was dissolved in 5 l. water, and the free acid precipitated by adding sufficient concentrated HCl diluted with an equal volume of water to give a low pH value, e. g. between 1 and 2, at which the free alginic acid is precipitated in an easily filtrable form. The precipitate was collected on cheese cloth and largely freed of liquid by pressing in a hydraulic press. The pressed precipitate was then successively washed, once with water, four times with 0.5% HCl, twice with distilled water or until free of $Cl^-$ ions, and twice with 95% ethanol, approximately 12 l. portions being used in each case. A yield of 72 g. purified alginic acid, vacuum-dried over $P_2O_5$, was obtained, the product being finely ground prior to final drying.

2. *Sulfation.*—Nine grams purified alignic acid, preferably containing not over 1%–2% moisture, was stirred in a mixture of 90 ml. dry pyridine and 21 ml. chlorosulfonic acid at 60° C. for 8 hours, atmospheric moisture being excluded. The reaction mixture was cooled and poured into 250 ml. cold water; undissolved solids were removed by filtration. Alginic acid sulfate ester pyridinium salt was then precipitated by adding 4 volumes methanol (ethanol can also be used), washed several times with alcohol and partially dried. Yield, 6 g., dry basis.

3. *Fractionation.*—The constituents higher in sulfur are more readily soluble in water than the low-sulfur constituents. Accordingly the pyridinium-sulfate-ester product so obtained was stirred for approximately 1 minute with 50 ml. water at room temperature, and immediately centrifuged. The supernatant liquid was designated A and the sediment A'. The sediment A' after prompt separation from A was again treated in the same way by stirring with 50 ml. water and centrifuging, producing a supernatant liquid B and a second sediment B'. B' was promptly separated and dissolved in 150 ml. water to produce solution C. Solution C subsequently proved to have little or no anticoagulation value. Solutions A, B and C were separately worked up as follows:

The sodium salts of the esters were formed by bringing the solutions to pH 9 (determined potentiometrically) by first adding 5N NaOH solution and then making the final adjustment with more dilute solution. Four volumes of methanol (ethanol can also be used) were added, the precipitate separated, pressed out, redissolved in water, reprecipitated with 4 volumes alcohol, washed twice with alcohol and twice with diethyl ether, and dried under vacuum over $P_2O_5$. The respective yields from one series of the three solutions and the respective sulfur contents of the products on analysis were:

| Solution | Yield, g. | Percent S |
|---|---|---|
| A | 4.29 | 11.16 |
| B | 1.01 | 9.5 |
| C | 0.34 | 5.35 |

In another series 54 g. purified alginic acid gave the following results.

| Solution | Yield, g. | Percent S |
|---|---|---|
| A | 20.86 | 13.05 |
| B | 11.31 | 12.63 |

4. *Assay and toxicity*.—The potency of samples of alginic acid sulfate sodium salts was compared with that of standard heparin by in-vitro tests similar in principle to those described by Foster, J. Lab. Clin. Med., 27 (1942), 820.

The toxicity by intravenous injection in mice was determined as LD 50 in terms of mg. substance per kg. body weight of mouse, LD 50 being the minimum dosage that causes death in 50 percent of the test animals.

The potency and toxicity determined in this way are given for a number of preparations in the following examples.

5. *In-vivo tests*.—The solid recovered from solution A as in Example 3 was tested in rabbits by intravenously injecting the dose dissolved in 2 ml. distilled water adjusted to pH 7 with HCl or NaOH, then after stated intervals withdrawing blood samples and determining their coagulation time. Results were:

Sulfur content _____per cent__ 11.16
In vitro potency _____u./mg__ 7.5
LD 50 _____mg./kg__ 988

| Dosage, mg./kg. | Sample taken after— | Coagulation time |
|---|---|---|
| 20 mg | 30 minutes | 18 minutes. |
|  | 60 minutes | 30 minutes. |
|  | 90 minutes | 2 minutes. |
| 80 mg | 180 minutes | More than 72 hours. |

6. Another run was made as described in Example 3 and the high-sulfur fraction tested with the following results:

Sulfur content _____per cent__ 13.26
In vitro potency _____u./mg__ 5–10
LD 50 _____mg./kg__ 1050

| Dosage, mg./kg. | Sample taken after— | Coagulation time |
|---|---|---|
| 10 mg | Ineffective |  |
| 20 mg | 30 minutes | 17 hours. |
|  | 60 minutes | 16 hours. |
|  | 90 minutes | 5 minutes. |
|  | 120 minutes | Normal. |
| 40 mg | 30 minutes | More than 72 hours. |
|  | 60 minutes | 24 hours. |
|  | 90 minutes | 2½ hours. |
|  | 120 minutes | 1 hour. |
|  | 180 minutes | Normal. |
| 125 mg | 8 hours | More than 24 hours. |
|  | 24 hours | Normal. |
| 150 mg | 30 minutes | More than 72 hours. |
|  | 60 minutes | More than 72 hours. |
|  | 90 minutes | More than 72 hours. |
|  | 120 minutes | More than 72 hours. |
|  | 150 minutes | More than 72 hours. |
|  | 180 minutes | Partially clotted in 21 hours. |
| 250 mg | 180 minutes | More than 72 hours. |

In the above cases, dosages up to ¼ LD 50 produced no dangerous toxic effects in the test animals.

I claim:
1. Alginic acid sulfate compounds selected from the class consisting of alginic acid sulfates and water-soluble salts thereof.
2. A composition comprising an alginic acid ester of sulfuric acid.
3. A composition comprising a sodium salt of an alginic acid ester of sulfuric acid.
4. A composition comprising a mixture of sodium salts of alginic acid esters of sulfuric acid, the composition containing between about 11 and about 17 percent sulfur by weight.
5. A blood anticoagulant comprising an aqueous solution of non-toxic salts of alginic acid esters of sulfuric acid.
6. A blood anticoagulant as defined in claim 5 in which the non-toxic salts are sodium salts containing between about 11 and about 17 percent sulfur by weight.
7. The method of producing alginic acid sulfate which comprises reacting alginic acid containing a small amount of moisture with an anhydrous halogen-containing sulfating agent in the presence of an anhydrous acid-acceptor at an elevated temperature below the boiling point of water and in the absence of moisture other than that contained in the alginic acid.
8. In combination with the process defined in claim 7, the further steps of fractionating the sulfated product into a fraction of higher sulfur content more readily soluble in water and a fraction of lower sulfur content less readily soluble in water, which comprise: dissolving the sulfation mixture in cold water, precipitating an alginic acid sulfate salt by the addition of a lower water-soluble alcohol, separating and stirring the precipitated salt for a short time with an insufficient amount of water to dissolve all the salt, centrifuging the water-salt mixture, separating the supernatant liquid from the solid residue, which constitutes a sulfation fraction of lower sulfur content and less ready solubility in water, and recovering from the supernatant liquid dissolved salt which constitutes a sulfation fraction of higher sulfur content and more ready solubility in water.
9. The method as defined in claim 7 in which the sulfating agent is chlorosulfonic acid and the acid-acceptor is pyridine.

ERIC G. SNYDER.

REFERENCES CITED

The following references are of record in the file of this patent:

UNITED STATES PATENTS

| Number | Name | Date |
|---|---|---|
| 1,907,371 | Stenzl | May 2, 1933 |
| 2,016,299 | Schulze | Oct. 8, 1935 |
| 2,284,566 | Elsner | May 26, 1942 |

OTHER REFERENCES

Chemical Abstracts, 1939, vol. 33, page 8307.
Chemical Abstracts, 1937, vol. 31, page 4696.
Chemical Abstracts, 1933, vol. 27, page 5782.
Matuo Mfg. Chemist and Manufacturing Perfumer, February 1945, page 63.
J. A. M. A., September 30, 1944, pages 300–301.
Crowley, Surg. Gyn. Obs., December 1940, pages 777–781.
J. A. C. S., vol. 62, pages 1070-4 (1940).
Osol et al., The Dispensatory of the United States, 24th ed., 1947, J. P. Lippincott Co., pages 1054–1055.
Chargaff et al., J. Biol. Chem. (1936), vol. 115, pages 155–161.